United States Patent [19]
Graiver et al.

[11] Patent Number: 5,126,400
[45] Date of Patent: Jun. 30, 1992

[54] REINFORCED POLYORGANOSILOXANE ELASTOMERS

[75] Inventors: Daniel Graiver, Midland; Nedeljko V. Gvozdic, Bay City, both of Mich.

[73] Assignee: Dow Corning Corporation, Midland, Mich.

[21] Appl. No.: 559,786

[22] Filed: Jul. 30, 1990

[51] Int. Cl.$^5$ .............................................. C08L 29/04
[52] U.S. Cl. ........................................ 525/58; 525/61; 525/100
[58] Field of Search ................. 525/61, 58, 100

[56] References Cited

U.S. PATENT DOCUMENTS

| | | | |
|---|---|---|---|
| 3,227,777 | 1/1966 | Safford | 260/827 |
| 4,201,698 | 5/1980 | Itoh et al. | 260/3 |
| 4,214,057 | 7/1980 | Ishihara et al. | 525/100 |
| 4,219,591 | 8/1980 | Buning et al. | 427/387 |
| 4,302,553 | 11/1981 | Frisch et al. | 525/28 |
| 4,423,095 | 12/1983 | Blizzard | 427/387 |
| 4,567,221 | 1/1986 | Maruyama et al. | 524/436 |
| 4,608,187 | 8/1986 | Chang | 252/90 |
| 4,617,239 | 10/1986 | Maruyama et al. | 428/452 |
| 4,714,739 | 12/1987 | Arkley | 525/92 |
| 4,872,867 | 10/1989 | Itoh | 604/269 |
| 4,954,554 | 9/1990 | Bunge | 524/388 |

FOREIGN PATENT DOCUMENTS

| | | | |
|---|---|---|---|
| 2449085 | 4/1976 | Fed. Rep. of Germany | 525/58 |
| 38347 | 10/1978 | Japan . | |
| 54-050551 | 4/1979 | Japan | 525/58 |
| 99987 | 7/1980 | Japan . | |
| 73059 | 5/1982 | Japan . | |

Primary Examiner—Melvyn I. Marquis
Assistant Examiner—R. Dean, Jr.
Attorney, Agent, or Firm—Edward C. Elliott

[57] ABSTRACT

A curable polydiorganosiloxane is reinforced by mixing with a modified polyvinylalcohol (PVA). Fully hydrolyzed PVA is modified by dissolving or swelling in solvent, then adding a silylating agent of the formula $R''_b(R'_2SiO)_nSiR_aX_{4-a}$ where R is a group capable of undergoing hydrolysis to form a siloxane bond with the curable polydiorganosiloxane, R' is a monovalent alkyl or aryl radical having from 1 to 6 carbon atoms, optionally halogen substituted, and compatible with the curable polydiorganosiloxane, R'' is either R or R', X is a radical reactive with the hydroxyl on the PVA, a and b are integers of 0 to 3 inclusive, the sum of a plus b is from 1 to 3 inclusive, and n is from 0 to 35. This modified PVA is then mixed with the curable polydiorganosiloxane. The polydiorganosiloxane is then cured and the solvent is extracted to yield a cured polydiorganosiloxane reinforced with polyvinylalcohol.

11 Claims, No Drawings

REINFORCED POLYORGANOSILOXANE ELASTOMERS

BACKGROUND OF THE INVENTION

1. Field of the Invention

This invention relates to polydiorganosiloxane elastomers reinforced with modified polyhydroxy compounds.

2. Background Information

Useful silicone elastomers are prepared by crosslinking the linear polydiorganosiloxane after incorporating a reinforcing or extending filler into the polymer. In the absence of filler, only very weak elastomers are obtained. In order to obtain the best physical properties, reinforcing filler such as fumed or precipitated silica is used. These silica fillers have very small particle size and very large surface areas, on the order of greater than 50 square meters per gram of filler. An alternate route to obtaining useful polydiorganosiloxane elastomers is the use of linear polymers obtained from copolymerizing an organosiloxane monomer together with other non-silicone monomers or to chemically graft a non-siloxane chain onto the siloxane polymer. These alternate routes are fairly complex and are not further considered.

U.S. Pat. No. 3,227,777, issued Jan. 4, 1966, shows that attempts to blend ethylene-propylene copolymers with organosiloxane and then curing the resulting composition by an organic peroxide yielded a rather poor 30 to 45 kg/cm² tensile strength. U.S. Pat. No. 4,201,698, issued May 6, 1980, shows that when a reinforcing filler is included with such blends a tensile strength as high as 136 kg/m² was obtained. The organopolysiloxane used had at least two functional units of either mercapto groups or aliphatic unsaturated linkages in the molecule and a specific organosilicone compound which had a polysulfide linkage and one or more silicon-bonded hydroxy groups or hydrolyzable atoms or groups in the molecule was also required to be present in the composition.

Improved mechanical properties of blends made from polyvinylalcohol (PVA) and polydiorganosiloxane are reported in Japanese applications No. 38347/78, 99987/80, and 73059/82. Improved properties are obtained when silica filler is included as a reinforcing filler.

U.S. Pat. No. 4,219,591, issued Aug. 26, 1980, claims silylated PVA compounds effective as a coating agent for inorganic silicate substrates such as glass.

Compositions of PVA, silica, and low molecular weight organic silicone compounds are taught in U.S. Pat. No. 4,567,221, issued Jan. 28, 1986, as well as in the previously mentioned Japanese applications, 38347/78, 99987/80, and 73059/82. The mixtures are suggested as defogging compounds.

Polyvinylalcohol films toughened with a plurality of microdomains dispersed throughout the polymer are taught in U.S. Pat. No. 4,608,187, issued Aug. 26, 1986.

Chemical modification of PVA with a silylating agent is known as in U.S. Pat. No. 4,617,239, issued Oct. 14, 1986. This patent discloses a silicone containing PVA agents useful in paper coatings. One method introduces a silicone moiety into a PVA by post modification with a silylating agent or addition into a derivative of PVA that contains carboxylic groups such as partially saponified polyvinyl acetate followed by saponification of the residual acetates. Another method saponifies a copolymer of vinyl ester and silicone-containing olefinic unsaturated monomer followed by addition polymerization.

SUMMARY OF THE INVENTION

A polydiorganosiloxane elastomer reinforced with polyvinylalcohol (PVA) is produced by first modifying fully hydrolyzed PVA by adding a silyl group to the polymer, then mixing the silyl containing PVA into a curable polydiorganosiloxane and curing the polydiorganosiloxane to give an elastomer, and finally removing the solvent used in the preparation of the modified PVA.

The process of this invention results in a cured silicone elastomer which is reinforced with PVA. This type of reinforcement can be used to provide silicone elastomers which have good physical properties, but do not contain particulate fillers. Elastomers without particulate fillers are desirable in medical applications.

DESCRIPTION OF THE INVENTION

This invention relates to a method of producing a polydiorganosiloxane reinforced with a modified PVA comprising (A) preparing a modified PVA by
  (1) dissolving less than 20 percent by weight of fully hydrolyzed PVA having a molecular weight of greater than 10,000 in an organic solvent capable of dissolving or swelling the PVA and not reacting with silylating agent (2), the polyvinylalcohol and solvent being 100 percent by weight, then
  (2) adding sufficient silylating agent of the formula $R''_b(R'_2SiO)_nSiR_aX_{3-a}$ or of the formula $R''_bSiR_aX_{4-a-b}$ where R is a group capable of undergoing hydrolysis to form a siloxane bond with the curable polydiorganosiloxane of step (B), R' is a monovalent alkyl or aryl radical having from 1 to 6 carbon atoms, optionally halogen substituted, and compatible with the curable polydiorganosiloxane of step (B), R" is either R or R', X is a radical reactive with the hydroxyl on the polyvinylalcohol, a in an interger of 1, 2, or 3, b is an integer of 0, 1, or 2, the sum of a plus b is from 1 to 3 inclusive, and n is from 1 to 35, with the proviso that X must be present to react with at least 10 percent of the available hydroxyl groups on the PVA, then (B) adding the modified PVA solution to a curable polydiorganosiloxane and mixing to give a uniform mixture, then (C) adding a crosslinking agent if necessary to cure the polydiorganosiloxane and then curing the polydiorganosiloxane, then (D) extracting the solvent from the mixture, to give a cured polydiorganosiloxane reinforced by the modified PVA.

In the absence of reinforcing agents, silicone elastomers have poor physical properties such as tensile strength and elongation. Through the use of reinforcing agents, such as fume silica, it is possible to produce silicone elastomers having tensile strengths of 100 psi and higher and elongations at break of 1000 percent or greater. The silanol groups on the polydiorganosiloxane are thought to react with hydroxyl groups of the surface of the silica to give an interaction which leads to enhanced physical properties of the silicone elastomer.

An alternative route to obtaining useful polydiorganosiloxane elastomers has been to use copolymers of silicone and non-silicone polymers or to chemically graft a non-siloxane chain onto a siloxane polymer. These alternative routes to better physical properties are fairly complex and expensive.

Blends of polydiorganosiloxane with other synthetic organic rubber is very difficult and does not produce the synergistic combination of properties desired from such blends as is shown in the above referenced U.S. Pat. No. 3,227,777. Better results are obtained when used in conjunction with silica filler as taught in U.S. Pat. No. 4,201,698.

The method of this invention prepares a modified PVA by reacting a silylating agent with a fully hydrolyzed PVA. The PVA can be any of the commercially available grades which are available. The grades vary in molecular weight from as low as about 10,000 to as high as about 115,000. The PVA is preferably fully hydrolyzed with less than 2 percent residual carboxylate moieties left in the polymer. It is further preferred to use PVA which has less than 1 percent residual carboxylate groups if high mechanical strength is desired. The amount of branching, 1,2 glycol linkages, and the stereoregularity of the PVA does not seem to affect the compatibility or the mechanical strength of the blend as much as does the molecular weight and the degree of hydrolysis.

The PVA is modified by reacting with a silylating agent of the formula $R''_b(R'_2SiO)_nSiR_aX_{3-a}$ or of the formula $R''_bSiR_aX_{4-a-b}$ where R is a group capable of undergoing hydrolysis to form a siloxane bond with the curable polydiorganosiloxane of step (B), R' is a monovalent alkyl or aryl radical having from 1 to 6 carbon atoms, optionally halogen substituted, and compatible with the curable polydiorganosiloxane of step (B), R'' is either R or R', X is a radical reactive with the hydroxyl on the polyvinylalcohol, a in an integer of 1, 2, or 3, b is an integer of 0, 1, or 2, the sum of a plus b is from 1 to 3 inclusive, and n is from 0 to 35. The function of R in the silylating agent is to provide bonding to the curable polydiorganosiloxane of step (B) by undergoing hydrolysis and then reaction with the polydiorganosiloxane. Preferred R groups are alkoxy, aryloxy, and carboxy radicals having from 1 to 6 carbon atoms. Preferred R groups include methoxy, ethoxy, phenoxy, and acetoxy. The R' radical is selected to enhance the compatibility of the modified PVA with the silicone matrix. R' should be similar to the radicals of the polydiorganosiloxane. For example, if the modified PVA is going to be used to reinforce a polydimethylsiloxane, then R' would preferably be a methyl radical. If the modified PVA is going to be used to reinforce a fluorosiloxane, then R' would preferably be 1,1,1-trifluoropropyl radical. R' is less than 6 carbon atoms to maintain the siloxane nature and eliminate crystallization of this alkyl group. R'' is selected from either R or R'. If R'' is selected from R, then the silylating agent is capable of undergoing hydrolysis to form a siloxane bond with the curable polydiorganosiloxane. If R'' is selected from R', then the silylating agent is compatible with the curable polydiorganosiloxane. X is a radical which is reactive with the hydroxyl group on the PVA. X is selected from the group consisting of hydrogen, hydroxyl radical, esters having the formula $-CO_2R^1$, alkoxy radicals having the formula $-OR^1$, primary and secondary amines having the formula $-R^1NH_2$ and $-R^1R^2NH$, ether amines having the formula $-R^2ONH_2$, isocyanester having the formula $-R^1NCO$, primary nitrile radicals having the formula $-R^2C\equiv N$, primary sulfanyl radicals having the formula $-R^1SH$, and monoperoxide radicals selected from epoxy alkyl, epoxy oxyalkyl, epoxy dicyclicalkyl, and epoxy dicyclic radicals; where $R^1$, $R^2$ and said alkyl radicals are individually selected from saturated alkyl radicals having 1 to 6 carbon atoms and $R^2$ is further selected from cycloalkyl, aryl, and alkaryl radicals containing 6 to 10 carbon atoms. When a is an integer of from 1 to 3, it means that the silylating agent has at least one group present which is capable with reacting with the secondary alcohol on the PVA to produce grafts with relatively stable bonds. This also means there is at least one group capable of reacting with the silicone matrix to form a siloxane bond. The silylating agent can be a silane when n is zero or a siloxane when n is greater than zero. The upper limit of n is thought to be about 35 in order to ensure that the silylating agent is soluble in the PVA/solvent of (1).

It is preferred that the reactivity of R with the secondary alcohols of the PVA be less than the reactivity of X. Proper choice of the silylating agent and the reaction conditions will prevent premature crosslinking and difficulties in subsequent processing. The functional group X that is to react with the hydroxyl groups on the PVA should be much more reactive than the group R on the silane which may also be reactive with the same hydroxyl groups. This difference in reactivity is required to minimize undesirable side reactions that will lead to premature gelation. For example, if X in an epoxy group and R are methoxy radicals, then X is much more reactive toward the hydroxyl groups on the PVA as compared to the equilibration reaction of the methoxy groups and the hydroxyl groups on the PVA. If a silane was chosen, for example, where the X radical was epoxy and the R radials were chlorides, then the higher reactivity of the chloride radicals would lead to a gelled product. Examples of silylating agents include organohalogenosilanes such as gamma-glycidoxypropyl-1,1,1-trifluoropropyldimethoxysilane, dialkylcarboxysilane such as gamma-glycidoxypropyldimethylacetoxysilane, and organoalkoxysilanes such as gamma-glycidcyanopropyltriethoxysilane.

The PVA is first dissolved in an organic solvent such as dimethylsulfoxide (DMSO). Suitable solvents are those which will dissolve the PVA or swell it to a large degree but which will not react with the silylating agent. Suitable solvents include dimethylsulfoxide, ethylene glycol, glycerol, dimethyl formamide, and pyridine. Solution concentrations up to about 20 percent by weight can be obtained by simply heating the mixture of PVA and solvent at about 100° C. It is preferred to solubilize the PVA in the solvent under an inert atmosphere such as nitrogen to minimize the degradation of the PVA during heating. The viscosity of the solution will depend upon the concentration of PVA, the molecular weight of the PVA, and the degree of hydrolysis. Highest viscosity is obtained when high concentration, high molecular weight, and high degree of hydrolysis polymer is used.

After the PVA is solubilized, the silylating agent is added to the solution. The degree of silylation may be freely adjusted by the amount of the silylating agent, the reaction time, and the reaction temperature. The silylating agent can manifest an effect even at relatively low amounts, but it is preferred that an amount sufficient to react with at least 10 percent of the available hydroxyl groups on the PVA be used.

The curable polydiorganosiloxane can be any linear alkyl or aryl polydiorganosiloxane with functional groups either at the ends of the polymer chains or distributed along the chains. The functional groups can be any group which will react with itself or a crosslink agent to give an elastomeric network. Preferred groups are silanols, alkoxy, and carboxyl groups. The curable polydiorganosiloxane may also include a crosslink agent having greater than two reactive groups which will react with the functional groups on the polydiorganosiloxane, such as an alkyltrialkoxysilane, alkyltricarboxylsilane, alkyltrioximosilane, alkyltriketoximosilane, alkyltriaminoxysilane, alkyltriaminosilane, and alkyltriphosphatosilane. Any combination of functional polydiorganosiloxane and reactive crosslink agent, together with a catalyst such as tin salt of carboxylic acid if needed, may be used. These curable polydiorganosiloxane systems are well known in the art.

The silylated PVA in solution is then mixed under mild conditions with the curable polydiorganosiloxane to obtain a uniform mixture. The curable polydiorganosiloxane is then crosslinked by whatever method has been chosen. The crosslink reaction prevents a gross phase separation of the two polymers from the solvent blend upon the subsequent step of extracting the solvent. After the polydiorganosiloxane is crosslinked, the solvent used to dissolve the PVA is removed. If a low boiling point solvent has been used, it can be removed by evaporation or heating and evaporation. If a high boiling point solvent, such as dimethylsulfoxide (DMSO), has been used, it is preferably first extracted by immersing the cured blend in a large excess of another solvent with a low boiling point, then removing the low boiling point solvent by evaporation.

When the solvent is removed, the product is a cured polydiorganosiloxane which is reinforced by the modified PVA. This product can be particularly useful in medical articles which do not contain particulate filler.

The following examples are included for illustrative purposes only and should not be construed as limiting the invention which is properly set forth in the appended claims.

EXAMPLE 1

A solution of PVA was prepared by mixing 20 g of PVA having a molecular weight of about 89,000 and more than 99.5 mole percent hydrolysed groups (less than 0.5 mole percent carboxylate moieties) with 100 g of dimethylsulfoxide (DMSO) in a three-necked flask equipped with a mechanical stirrer, thermometer, and a reflux condenser. The mixture was heated to 110° C. under a nitrogen atmosphere and stirred until all the PVA was dissolved. The solution was then allowed to cool to 60° C. and 4.5 g of gamma-glycidoxypropyltrimethoxysilane was added dropwise. Some increase in viscosity was noticeable after the addition of the silane, but the solution remained flowable.

A blend of the modified PVA above with a polydiorganosiloxane was prepared by combining 10 g or the modified PVA, 18 g of hydroxyl endblocked polydimethylsiloxane having a molecular weight of about 60,000, and 2.5 g of methyltrimethoxysilane in a sealed mixer. The mixture was stirred for 20 minutes until uniform, then 0.5 g of dibutyltindilaurate condensation catalyst was added and stirring continued for 3 minutes. The catalyzed blend was then cast into a 1.5 mm thick sheet and allowed to cure in the presence of atmospheric moisture for 3 days. The cured sheet was placed in hexane to extract the DMSO, followed by removing the hexane in a vacuum oven at 80° C. The final test sheet was cut into test samples and measured for physical properties in accordance with ASTM D 412. The tensile strength was 625 psi, the elongation at break was 580 percent, the initial modulus was 350 psi, and the toughness was 2,050 psi. Toughness is defined here as the integrated area under the stress-strain curve.

EXAMPLE 2

The procedure of example 1 was repeated, using 10 g of the modified PVA and 12 g of the polydimethylsiloxane. The physical properties are shown in Table 1.

EXAMPLE 3

The procedure of example 1 was repeated, using 10 g of the modified PVA and 8 g of the polydimethylsiloxane. The physical properties are shown in Table 1.

EXAMPLE 4

This example does not contain a crosslink agent other than the methoxy functional groups on the silylating agent which are attached to the modified PVA.

A blend was prepared from 10 g of the modified PVA of example 1, 30 g of the polydimethylsiloxane of example 1 and 0.5 g of dibutyltindilaurate by mixing together for 15 minutes in the absence of moisture. The blend was then cast into a 1.5 mm sheet and allowed to cure for 1 week in the presence of moisture. At that time, a noticeable crosslinking had taken place and the sheet was placed in hexane, then placed into a hood with maximum airflow and dried. After solvent removal, 26 g of the polydimethylsiloxane had been extracted. This 26 g of polydimethylsiloxane was not crosslinked by the silylated PVA, but 4 grams of the polydimethylsiloxane was crosslinked by the silylated PVA. The properties of the sheet were measured as in example 1, with the results shown in Table I.

COMPARATIVE EXAMPLE A

A mixture of 100 g of the polydimethylsiloxane of example 1 and 5 g of methyltrimethoxysilane was mixed for 5 minutes in the absence of moisture, then 0.5 g of dibutyltindilaurate was mixed in for 1 minute. The uniformly mixed sample was then cast into a sheet, allowed to cure for 2 weeks and then tested as in example 1 with the results shown in Table I.

COMPARATIVE EXAMPLE B

The partially silylated PVA from example 1 was cast onto a Teflon sheet. After 30 minutes, the sheet was submerged in a bath of acetone to extract the DMSO from the polymer. The acetone was then removed by placing the sheet in a hood under maximum air flow for 1 day. The obtained sheet was brittle, almost like the original, unmodified PVA.

TABLE I

| Example | PVA Wt. % | Tensile Strength psi | Ultimate Elongation percent | Initial Modulus psi | Toughness psi |
|---------|-----------|----------------------|-----------------------------|---------------------|---------------|
| A | 0 | 80 | 340 | 540 | — |
| B | 100 | Brittle, properties not measured | | | |
| 1 | 35 | 625 | 580 | 350 | 2,050 |
| 2 | 45 | 1040 | 440 | 1200 | 2,850 |
| 3 | 55 | 900 | 290 | 3000 | 1,900 |

TABLE I-continued

| Example | PVA Wt. % | Tensile Strength psi | Ultimate Elongation percent | Initial Modulus psi | Toughness psi |
|---------|-----------|---------------------|----------------------------|---------------------|---------------|
| 4 | 72 | 3800 | 130 | 4706 | — |

That which is claimed is:

1. A method of producing a polydiorganosiloxane reinforced with a modified polyvinylalcohol comprising (A) preparing a modified polyvinylalcohol by (1) dissolving up to 20 percent by weight of fully hydrolyzed polyvinylalcohol having a molecular weight of greater than 10,000 in an organic solvent capable of dissolving or swelling the polyvinylalcohol and not reacting with silylating agent (2), the polyvinylalcohol and solvent being 100 percent by weight, then (2) adding sufficient silylating agent of the formula $R''_b(R'_2SiO)_n SiR_a X_{3-a}$ or of the formula $R''_b SiR_a X_{4-a-b}$ where R is a group capable of undergoing hydrolysis to form a siloxane bond with the curable polydiorganosiloxane of step (B), R' is a monovalent alkyl or aryl radical having from 1 to 6 carbon atoms, optionally halogen substituted, and compatible with the curable polydiorganosiloxane of step (B), R" is either R or R', X is a radical reactive with the hydroxyl on the polyvinylalcohol, a in an integer of 1, 2, or 3, b is an integer of 0, 1, or 2, the sum of a plus b is from 1 to 3 inclusive, and n is from 1 to 35, with the proviso that X must be present; to react with at least 10 percent of the available hydroxyl groups on the PVA, then (B) adding the modified polyvinylalcohol solution to a curable polydiorganosiloxane and mixing to give a uniform mixture, then (C) adding a crosslinking agent, if necessary, to cure the polydiorganosiloxane and then curing the polydiorganosiloxane, then (D) extracting the solvent from the mixture, to give a cured polydiorganosiloxane reinforced by the modified polyvinylalcohol.

2. The method of claim 1 in which a is 1, 2, or 3, and b is 0, 1, or 2.

3. The method of claim 1 in which the fully hydrolyzed polyvinylalcohol has less than 2 percent residual carboxylate moieties.

4. The method of claim 3 in which the fully hydrolyzed polyvinylalcohol has less than 1 percent residual carboxylate moieties.

5. The method of claim 1 in which the silylating agent is an alkyltrialkoxysilane.

6. The method of claim 4 in which the curable polydiorganosiloxane is a hydroxyl endblocked polydiorganosiloxane.

7. The method of claim 6 in which the crosslinker is an alkyltrialkoxysilane where the alkyl radical has from 1 to 6 carbon atoms and the alkoxy radical has from 1 to 6 carbon atoms.

8. The method of claim 5 in which the silylating agent is an epoxy functional trialkoxysilane, the curable polydiorganosiloxane is a hydroxyl endblocked polydiorganosiloxane, and the crosslinking agent is methyl trimethoxysilane.

9. A composition comprising the product obtained by mixing (A) a linear polydiorganosiloxane having organo groups chosen from the group consisting of alkyl radicals, aryl radicals, and functional groups located either at the ends of the polydiorganosiloxane chain or distributed along the chain, the functional groups selected from the group consisting of silanol, amine, and carboxyl; the polydiorganosiloxane having a molecular weight sufficiently high to yield a rubbery material, or the polydiorganosiloxane being a combination of a low molecular weight silanol terminated polydiorganosiloxane together with a chain extender which will react with the silanol terminated polydiorganosiloxane, and (B) a chemically modified hydrolyzed polyvinylalcohol having a number average molecular weight of greater than 10,000, less than 2 percent residual carboxylate moieties, and greater than two silyl groups of the formula $R_a Si-$ where R is a group capable of undergoing hydrolysis to form a siloxane bond with the curable polydiorganosiloxane of (A), and a is from 1 to 3.

10. The composition produced by the method of claim 1.

11. The composition produced by the method of claim 2.

* * * * *